United States Patent
Okada et al.

(10) Patent No.: US 10,498,920 B2
(45) Date of Patent: Dec. 3, 2019

(54) LIGHT SCANNING APPARATUS AND IMAGE FORMING APPARATUS

(71) Applicant: CANON KABUSHIKI KAISHA, Tokyo (JP)

(72) Inventors: Yuta Okada, Moriya (JP); Yuichiro Imai, Tokyo (JP); Takehiro Ishidate, Tokyo (JP); Daisuke Aruga, Abiko (JP); Yasuaki Otoguro, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/895,818

(22) Filed: Feb. 13, 2018

(65) Prior Publication Data

US 2018/0234573 A1 Aug. 16, 2018

(30) Foreign Application Priority Data

Feb. 15, 2017 (JP) ................................. 2017-025997

(51) Int. Cl.
*H04N 1/028* (2006.01)
*H04N 1/00* (2006.01)

(52) U.S. Cl.
CPC ....... *H04N 1/0283* (2013.01); *H04N 1/00649* (2013.01); *H04N 1/02895* (2013.01)

(58) Field of Classification Search
None
See application file for complete search history.

(56) References Cited

U.S. PATENT DOCUMENTS

| 7,072,087 B2 | 7/2006 | Nakahata | 359/204.1 |
| 7,298,390 B2 | 11/2007 | Nakahata | 347/231 |
| 7,522,326 B1 | 4/2009 | Otoguro | 347/256 |
| 7,629,992 B2 | 12/2009 | Nakahata | 347/243 |
| 7,684,099 B2 | 3/2010 | Otoguro | 359/216.1 |
| 7,728,861 B2 | 6/2010 | Nakahata | 347/231 |
| 7,830,576 B2 | 11/2010 | Nakahata | 359/201.1 |

(Continued)

FOREIGN PATENT DOCUMENTS

JP 2012-113011 6/2012

OTHER PUBLICATIONS

U.S. Appl. No. 15/702,219, filed Sep. 12, 2017 Inventors: Takehiro Ishidate; Yuichiro Imai; Yuta Okada; Daisuke Aruga; Yasuaki Otoguro Title: Optical Scanning Apparatus And Image Forming Apparatus.

(Continued)

*Primary Examiner* — Frantz Bataille
(74) *Attorney, Agent, or Firm* — Venable LLP

(57) ABSTRACT

A light scanning apparatus including: a light receiving portion configured to receive a first laser beam to generate a synchronization signal; and a standing portion, wherein a first opening through which a part of the first laser beam that is emitted from a first light source and travels toward a rotary polygon mirror and the first laser beam that is emitted from the first light source and is deflected by the rotary polygon mirror pass and a second opening through which a part of the second laser beam that is emitted from a second light source and travels toward the rotary polygon mirror passes are provided in the standing portion, and wherein the first laser beam that is deflected by the rotary polygon mirror and passes through the first opening is incident on the light receiving portion.

16 Claims, 13 Drawing Sheets

(56) References Cited

U.S. PATENT DOCUMENTS

| | | | |
|---|---|---|---|
| 8,810,622 B2 | 8/2014 | Mamiya et al. | 347/242 |
| 8,917,305 B2 | 12/2014 | Nakahata et al. | 347/244 |
| 8,922,847 B2 | 12/2014 | Nakahata | 358/474 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 9,316,992 B2 | 4/2016 | Ishidate et al. | G03G 15/04036 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,772,577 B2 | 9/2017 | Ishidate et al. | G03G 15/043 |
| 2005/0062836 A1* | 3/2005 | Nakajima | G03G 15/011 347/225 |
| 2009/0244670 A1 | 10/2009 | Sato et al. | 359/205.1 |
| 2012/0081770 A1 | 4/2012 | Sato et al. | 359/204.1 |
| 2013/0286145 A1* | 10/2013 | Mamiya | G02B 26/127 347/224 |
| 2016/0216632 A1* | 7/2016 | Ishidate | G03G 15/043 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/00525 |
| 2017/0336731 A1 | 11/2017 | Ishidate et al. | G03G 15/0435 |

OTHER PUBLICATIONS

U.S. Appl. No. 15/891,087, filed Feb. 7, 2018 Inventors: Hisashi Namba; Masahiro Ogura; Yosuke Murakami; Ken Katsuta; Yuta Okada Title: Light Scanning Apparatus, Housing, And Image Forming Apparatus.

U.S. Appl. No. 15/891,064, filed Feb. 7, 2018 Inventors: Hiroshi Nakahata; Yasuaki Otoguro; Takehiro Ishidate; Yuta Okada; Daisuke Aruga Title: Casing Of Optical Scanning Apparatus, And Optical Scanning Apparatus.

U.S. Appl. No. 15/706,317, filed Sep. 15, 2017 Inventors: Hitoshi Iwai; Shinichiro Hosoi; Takehiro Ishidate; Title: Image Forming Apparatus.

U.S. Appl. No. 15/720,644, filed Sep. 29, 2017 Inventors: Shinichiro Hosoi; Takehiro Ishidate; Hitoshi Iwai Title: Image Forming Apparatus.

U.S. Appl. No. 15/801,033, filed Nov. 1, 2017 Inventors: Naoka Omura; Koichi Taniguchi; Daisuke Aruga Title: Image Forming Apparatus.

U.S. Appl. No. 15/891,071, filed Feb. 2, 2018 Inventors: Yuta Okata; Yuichiro Imai; Daisuke Aruga; Takehiro Ishidate; Yasuaki Otoguro Title: Optical Scanning Apparatus And Image Forming Apparatus.

U.S. Appl. No. 15/891,057, filed Feb. 7, 2018 Inventors: Yasuaki Otoguro; Yuichiro Imai; Yuta Okada; Daisuke Aruga; Takehiro Ishidate Title: Method For Manufacturing Light Scanning Apparatus, And Image Forming Apparatus.

U.S. Appl. No. 15/889,045, filed Feb. 5, 2018 Inventors: Yuichiro Imai Title: Light Scanning Apparatus And Image Forming Apparatus.

U.S. Appl. No. 15/889,802, filed Feb. 6, 2018 Inventors: Yuichiro Imai; Yuta Okada; Daisuke Aruga; Takehiro Ishidate; Yasuaki Otoguro Title: Light Scanning Apparatus, Image Forming Apparatus, And Housing.

U.S. Appl. No. 15/889,052, filed Feb. 5, 2018 Inventors: Takehiro Ishidate; Yasuaki Otoguro; Yichiro Imai; Daisuke Aruga; Yuta Okada Title: Casing Of A Light Scanning Apparatus, Light Scanning Apparatus, And Image Forming Apparatus.

U.S. Appl. No. 15/891,080, filed Feb. 7, 2018 Inventors: Daisuke Aruga; Hiroshi Nakahata; Yasuaki Otoguro; Takehiro Ishidate; Yuta Okada Title: Casing Of Optical Scanning Apparatus And Optical Scanning Apparatus.

U.S. Appl. No. 15/908,482, filed Feb. 28, 2018 Inventors: Yuta Okada; Hitoshi Iwai; Yasuaki Otoguro Title: Leaf Spring, Housing, Light Scanning Apparatus, And Image Forming Apparatus.

U.S. Appl. No. 15/718,510, filed Sep. 28, 2017 Inventors: Masahiro Ogura; Yuichiro Imai Title: Light Scanning Apparatus.

U.S. Appl. No. 15/702,219, filed Sep. 12, 2017.
U.S. Appl. No. 15/891,087, filed Feb. 7, 2018.
U.S. Appl. No. 15/891,064, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/891,071, filed Feb. 7, 2018.
U.S. Appl. No. 15/891,057, filed Feb. 7, 2018.
U.S. Appl. No. 15/889,045, filed Feb. 5, 2018.
U.S. Appl. No. 15/889,802, filed Feb. 6, 2018.
U.S. Appl. No. 15/889,052, filed Feb. 5, 2018.
U.S. Appl. No. 15/891,080, filed Feb. 7, 2018.
U.S. Appl. No. 15/908,482, filed Feb. 28, 2018.
U.S. Appl. No. 15/718,510, filed Sep. 28, 2017.

* cited by examiner

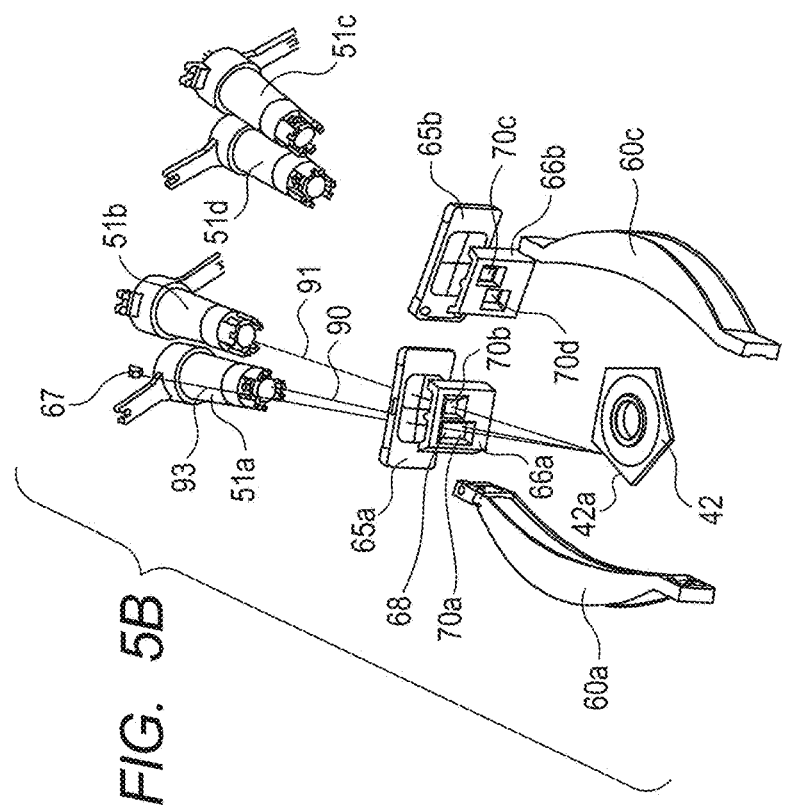
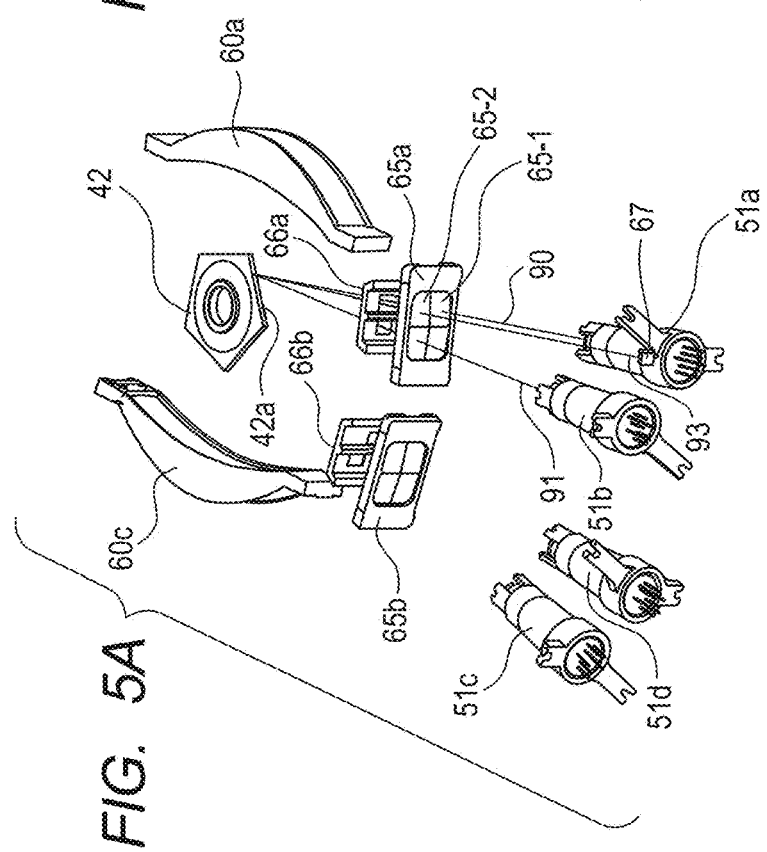

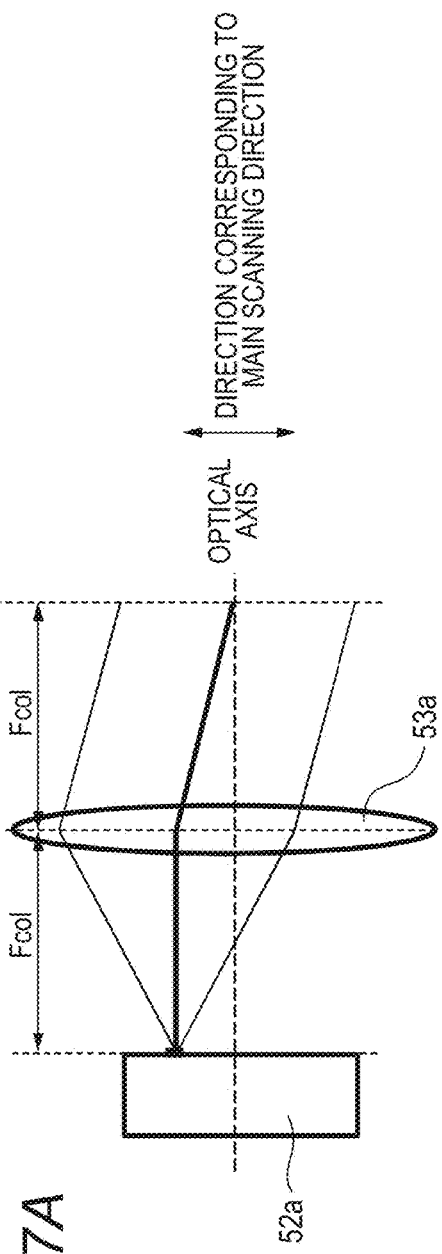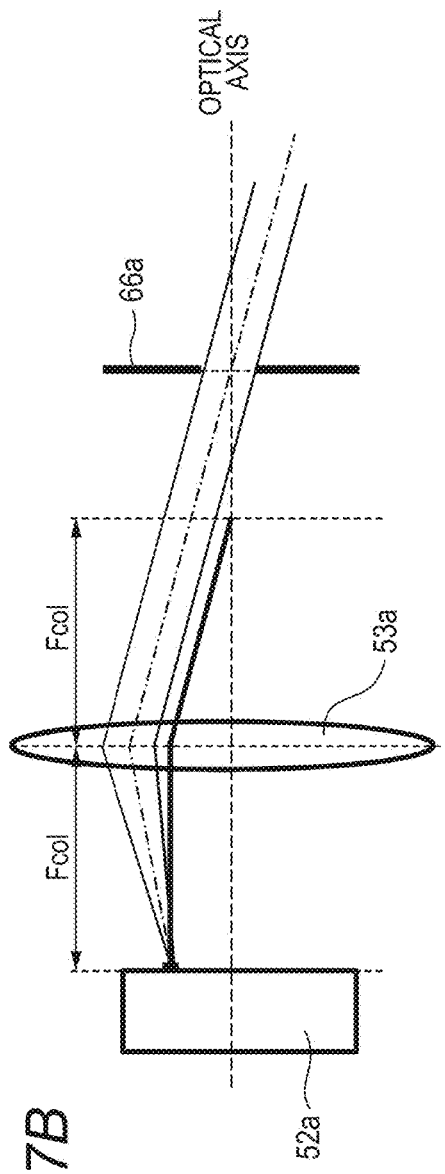
FIG. 7A
FIG. 7B

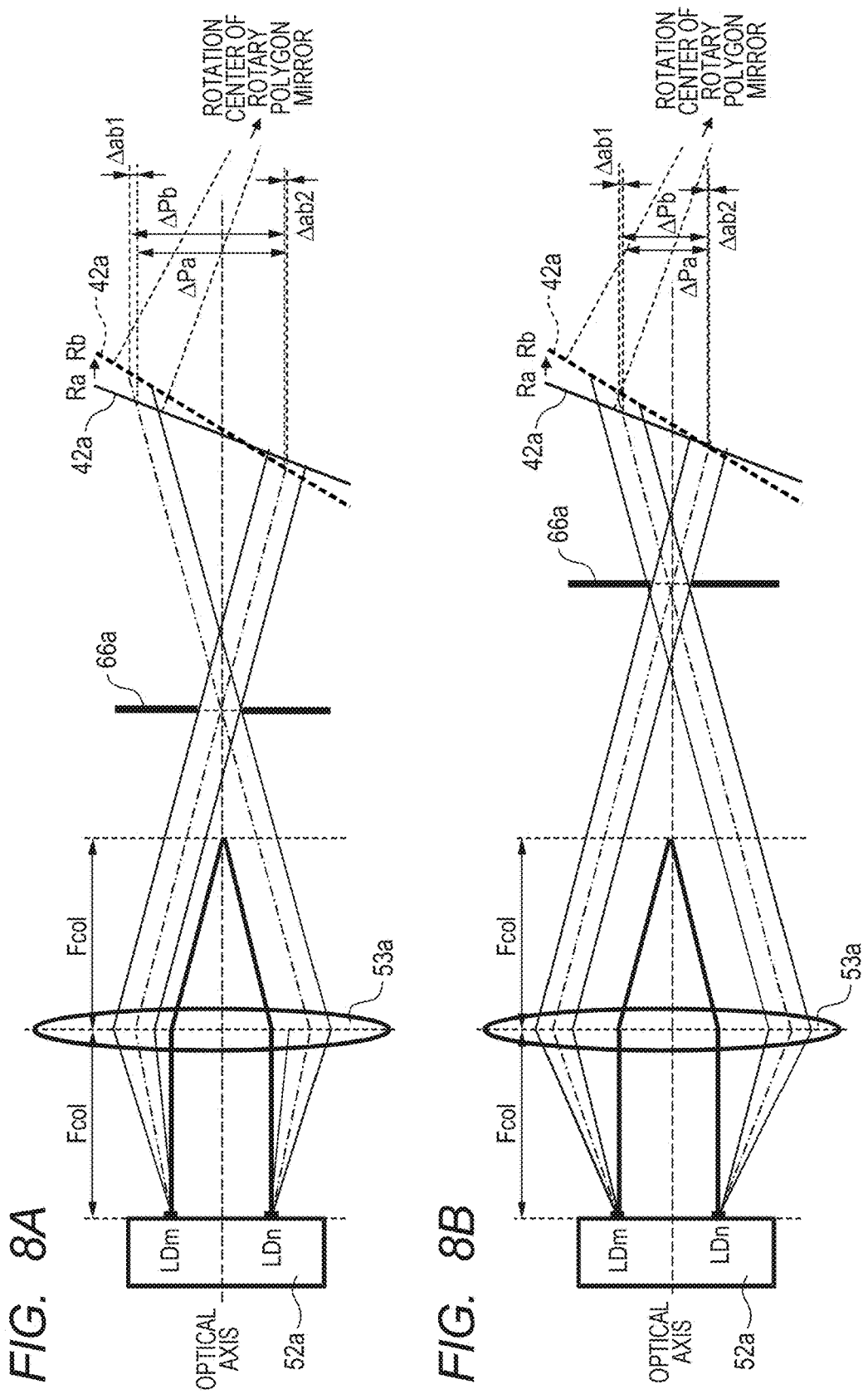

LIGHT SCANNING APPARATUS AND IMAGE FORMING APPARATUS

BACKGROUND OF THE INVENTION

Field of the Invention

The present invention relates to a light scanning apparatus which is used in an image forming apparatus such as a copier, a printer, a facsimile machine or a multifunction peripheral having these functions, and to an image forming apparatus equipped with the light scanning apparatus.

Description of the Related Art

A light scanning apparatus having the following configuration is well-known as a light scanning apparatus used in an electrophotographic image forming apparatus. That is, the light scanning apparatus forms a latent image on a photosensitive member by a process in which a light beam emitted from a light source is deflected by a rotary polygon mirror, and the deflected light beam is guided onto a photosensitive surface of the photosensitive member by an optical component such as a lens or a mirror.

Inside the light scanning apparatus a deflector is provided that has a rotary polygon mirror for deflecting and scanning a laser beam emitted from a semiconductor laser. The laser beam is scanned on the photosensitive member by the rotary polygon mirror, and lighting-up and turning off of the light of the semiconductor laser are repeated in coordination with the motion of the photosensitive member to thereby obtain a predetermined latent image on the photosensitive member.

As a common configuration of a light scanning apparatus, a configuration is known that obtains a reference signal at the lighting-up timing of a laser beam by a synchronization sensor. The light scanning apparatus is configured so that a laser beam that was deflected and scanned by a rotary polygon mirror is guided to the synchronization sensor, and the lighting-up timing of a laser is controlled by taking a signal that is output from the synchronization sensor as a trigger. Thereby, the laser is controlled so that an image is formed at a predetermined position on a photosensitive member. Further, the light scanning apparatus includes an opening plate (shaping member) between a semiconductor laser and the rotary polygon mirror, and the opening plate (shaping member) allows part of a laser beam to pass therethrough to thereby shape a spot shape of the laser beam (Japanese Patent Application Laid-Open No. 2012-113011).

However, the following problem arises in a light scanning apparatus in which optical paths are designed so that the optical path of a laser beam that is guided to a synchronization sensor is located close to the optical path of a laser beam that travels toward a rotary polygon mirror from a semiconductor laser. Although it is desirable that a shaping member that allows part of a laser beam to pass therethrough is disposed as close as possible to the rotary polygon mirror, disposing the shaping member close to the rotary polygon mirror results in the shaping member being located on the optical path of a laser beam that is to be guided to the synchronization sensor, and the shaping member blocks the optical path of the laser beam that is to be guided to the synchronization sensor.

SUMMARY OF THE INVENTION

The present invention has been made in view of the above described circumstances, and an object of the present invention is to provide a light scanning apparatus in which a standing portion that is disposed between a light source and a rotary polygon mirror and that includes an opening that allows a part of a laser beam emitted from the light source to pass therethrough does not block a laser beam that travels toward a light receiving portion.

To solve the aforementioned problem, a light scanning apparatus according to one embodiment of the present invention comprises:

a first light source configured to emit a first laser beam for exposing a first photosensitive member;

a second light source configured to emit a second laser beam for exposing a second photosensitive member;

a rotary polygon mirror having a plurality of reflection surfaces and driven to be rotated, the rotary polygon mirror deflecting the first laser beam by the plurality of reflection surfaces so that the first laser beam scans the first photosensitive member, the rotary polygon mirror deflecting the second laser beam by the plurality of reflection surfaces so that the second laser beam scans the second photosensitive member;

a light receiving portion configured to receive the first laser beam deflected by the rotary polygon mirror to generate a synchronization signal for determining an emitting timing of the first laser beam that the first light source emits based on image data in a scanning period of the first laser beam and an emitting timing of the second laser beam that the second light source emits based on image data in a scanning period of the second laser beam; and a standing portion provided between the first light source and the rotary polygon mirror and between the second light source and the rotary polygon mirror, wherein the first light source and the second light source are disposed on opposite sides to each other with respect to a virtual plane that is orthogonal to a rotation axis of the rotary polygon mirror and that intersects with the plurality of reflection surfaces, and the first light source and the second light source are disposed in the light scanning apparatus so that the first laser beam and the second laser beam are incident on a same reflection surface among the plurality of reflection surfaces, a central axis of a flux of the first laser beam that is incident on the reflection surface and the virtual plane form an angle that is greater than 0 degrees, a central axis of a flux of the second laser beam that is incident on the reflection surface and the virtual plane form an angle that is greater than 0 degrees, and when the central axis of the flux of the first laser beam that is incident on the reflection surface and the central axis of the flux of the second laser beam that is incident on the reflection surface are viewed from the rotation axis of the rotary polygon mirror, the central axis of the flux of the first laser beam and the central axis of the flux of the second laser beam form an angle that is greater than 0 degrees, wherein a first opening through which a part of the first laser beam that is incident on the rotary polygon mirror and the first laser beam deflected by the rotary polygon mirror to pass and a second opening through which a part of the second laser beam that is incident on the rotary polygon mirror passes are provided in the standing portion, and wherein the first laser beam that is deflected by the rotary polygon mirror and passes through the first opening is incident on the light receiving portion.

Further features of the present invention will become apparent from the following description of exemplary embodiments with reference to the attached drawings.

BRIEF DESCRIPTION OF THE DRAWINGS

FIG. 5A and FIG. 5B are perspective views illustrating optical paths from the light sources to the rotary polygon mirror of the light scanning apparatus according to the embodiment.

FIG. 7A and FIG. 7B are views for describing optical paths of laser beams emitted from a light emitting point according to the embodiment.

FIG. 8A and FIG. 8B are views for describing a positional difference between laser beams emitted from a plurality of light emitting points according to the embodiment.

DESCRIPTION OF THE EMBODIMENTS

Preferred embodiments of the present invention will now be described in detail in accordance with the accompanying drawings.

In the following description, the rotation axis direction of a rotary polygon mirror is taken as the Z-axis direction, the main scanning direction that is the scanning direction of a laser beam or the longitudinal direction of a mirror is taken as the Y-axis direction, and a direction that is perpendicular to the Y-axis and Z-axis is taken as the X-axis direction.

Embodiment 1

[Configuration of Image Forming Apparatus]

Figure 1:
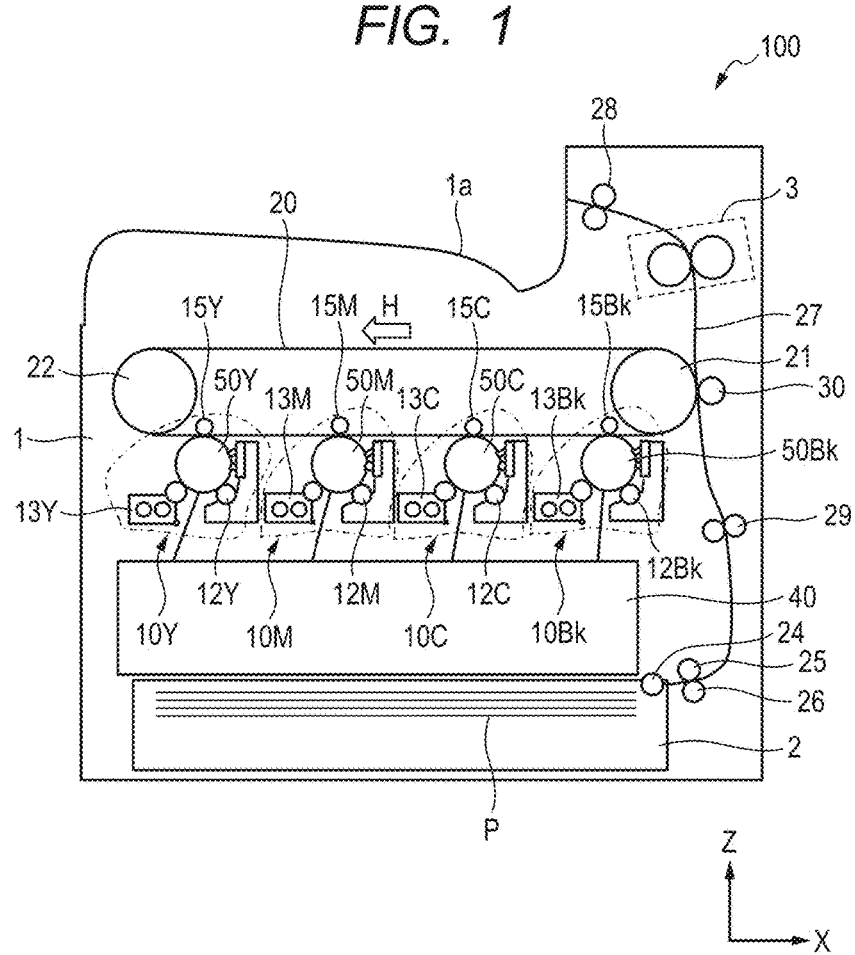
FIG. 1 is a schematic cross-sectional view of an image forming apparatus according to an embodiment.

The configuration of a tandem-type color laser beam printer 100 will be described as an image forming apparatus according to an embodiment. FIG. 1 is a schematic configuration diagram illustrating the overall configuration of the tandem-type color laser beam printer 100 according to the embodiment. The laser beam printer (hereinafter, simply referred to as a "printer") 100 includes four image forming engines 10Y, 10M, 10C and 10Bk (indicated by alternate long and short dashed lines in the drawing) that are configured to form a toner image of the colors yellow (Y), magenta (M), cyan (C) and black (Bk), respectively. Further, the printer 100 includes an intermediate transfer belt 20 as a transfer-receiving member onto which the toner images are transferred from the respective image forming engines 10Y, 10M, 10C and 10Bk. The printer 100 is configured so that the toner images that were transferred in multiple layers onto the intermediate transfer belt 20 are transferred onto a recording sheet P as a recording medium to thereby form a full color image. In the following description, the characters Y, M, C and Bk representing the respective colors are omitted unless otherwise necessary.

The intermediate transfer belt 20 is formed in an endless shape, and is passed over a pair of belt conveyance rollers 21 and 22, and is configured so that the toner images formed by the respective image forming engines 10 are transferred onto the intermediate transfer belt 20 while the intermediate transfer belt 20 is performing a rotating motion in the direction indicated by the arrow H. A secondary transfer roller 30 is arranged at a position opposite to the belt conveyance roller 21 so as to sandwich the intermediate transfer belt 20 therebetween. The recording sheet P is passed between the secondary transfer roller 30 and the intermediate transfer belt 20 that are in pressure contact with each other, and the toner image is thereby transferred onto the recording sheet P from the intermediate transfer belt 20.

The aforementioned four image forming engines 10Y, 10M, 10C and 10Bk are arranged in parallel on the underside of the intermediate transfer belt 20, and transfer toner images that were formed in accordance with image information of the respective colors onto the intermediate transfer belt 20 (hereinafter, this operation is referred to as "primary transfer"). The four image forming engines 10 are arranged along the rotation direction (arrow H direction) of the intermediate transfer belt 20 in the following order: the image forming engine 10Y for yellow, the image forming engine 10M for magenta, the image forming engine 10C for cyan, and the image forming engine 10Bk for black.

A light scanning apparatus 40 is arranged below the image forming engines 10. In accordance with the image information, the light scanning apparatus 40 exposes a photosensitive drum (photosensitive member) 50, which is a member to be scanned by a laser beam, provided in each of the image forming engines 10. The light scanning apparatus 40 is shared by all the image forming engines 10Y, 10M, 10C and 10Bk, and includes four semiconductor lasers 52 (see 52a in FIG. 4) that are light sources which emit a laser beam (light beam) that is modulated in accordance with image information for each color. The light scanning apparatus 40 also includes a rotary polygon mirror 42 that is rotationally driven to rotate at a high speed and scan the laser beams of these four optical paths along the rotation axis direction of the photosensitive drum 50 (see FIG. 2). Each laser beam that is scanned by the rotary polygon mirror 42 proceeds along a predetermined path while being guided by optical members arranged inside the light scanning apparatus 40. The respective laser beams that proceed along the predetermined paths pass through respective irradiation ports (transparent windows 43a to 43d in FIG. 6) provided in the upper part of the light scanning apparatus 40 and expose the photosensitive drums 50 of the respective image forming engines 10.

Each image forming engine 10 includes the photosensitive drum 50, and a charging roller 12 configured to uniformly charge the photosensitive drum 50 to a background portion potential. In addition, each image forming engine 10 includes a developing device 13 configured to develop an electrostatic latent image which is formed on the photosensitive drum 50 (on the member to be scanned by the laser beam) by exposure with the laser beam, to thereby form a toner image. The developing device 13 forms the toner image in accordance with the image information for the respective colors on the photosensitive drum 50 that is a photosensitive member. The developing device 13 adopts a system that uses two-component developer in which toner and a carrier are mixed. To eliminate the maintenance required in replacing developer accompanying changes in the developer over time, developer in which toner and a carrier are mixed is replenished into the developing device 13 from a replenishing cartridge (not shown). A development system that automatically discharges deteriorated developer is used for the developing device 13.

A primary transfer roller 15 is arranged at a position opposite the photosensitive drum 50 of each image forming engine 10 so as to sandwich the intermediate transfer belt 20 therebetween. By applying a predetermined transfer voltage to the primary transfer roller 15 as a transfer member, the toner image on the photosensitive drum 50 is transferred onto the intermediate transfer belt 20.

On the other hand, the recording sheet P is fed from a feeding cassette 2 housed in a lower portion of a printer housing 1 into the inside of the printer 100, specifically, is fed to a secondary transfer position at which the intermediate transfer belt 20 and the secondary transfer roller 30 are in contact with each other. The feeding cassette 2 is configured so as to be set by being pushed into the lower portion of the printer housing 1 from a side face of the printer housing 1. A pick-up roller 24 for drawing out the recording sheet P contained in the feeding cassette 2, and a feeding roller 25 are arranged in parallel at an upper portion of the feeding cassette 2 that is set in the printer housing 1. Further, a retard roller 26 configured to prevent double feeding of the recording sheets P is arranged at a position opposite the feeding roller 25. A conveyance path 27 for the recording sheet P inside the printer is provided substantially vertically along a right side face of the printer housing 1. The recording sheet P that is drawn out from the feeding cassette 2 positioned at the bottom portion of the printer housing 1 is conveyed upward along the conveyance path 27 and fed to registration rollers 29 which control the timing of the entry of the recording sheet P to the secondary transfer position. Thereafter, the toner image is transferred onto the recording sheet P at the secondary transfer position, and the recording sheet P is then fed to a fixing device 3 (illustrated by a broken line) that is provided on the downstream side in the conveyance direction. The recording sheet P on which the toner image has been fixed by the fixing device 3 is delivered via delivery rollers 28 onto a delivery tray 1a provided at an upper portion of the printer housing 1.

When forming a full color image by the color laser beam printer 100 configured in this manner, first the light scanning apparatus 40 exposes the photosensitive drum 50 of each image forming engine 10 at a predetermined timing in accordance with image information for each color. Thereby, a latent image in accordance with the image information is formed on the photosensitive drum 50 of the respective image forming engines 10. In this case, in order to obtain good image quality, the latent image formed by the light scanning apparatus 40 must be a latent image that was accurately reproduced at a predetermined position on the photosensitive drum 50.

[Light Scanning Apparatus]

Figure 2:
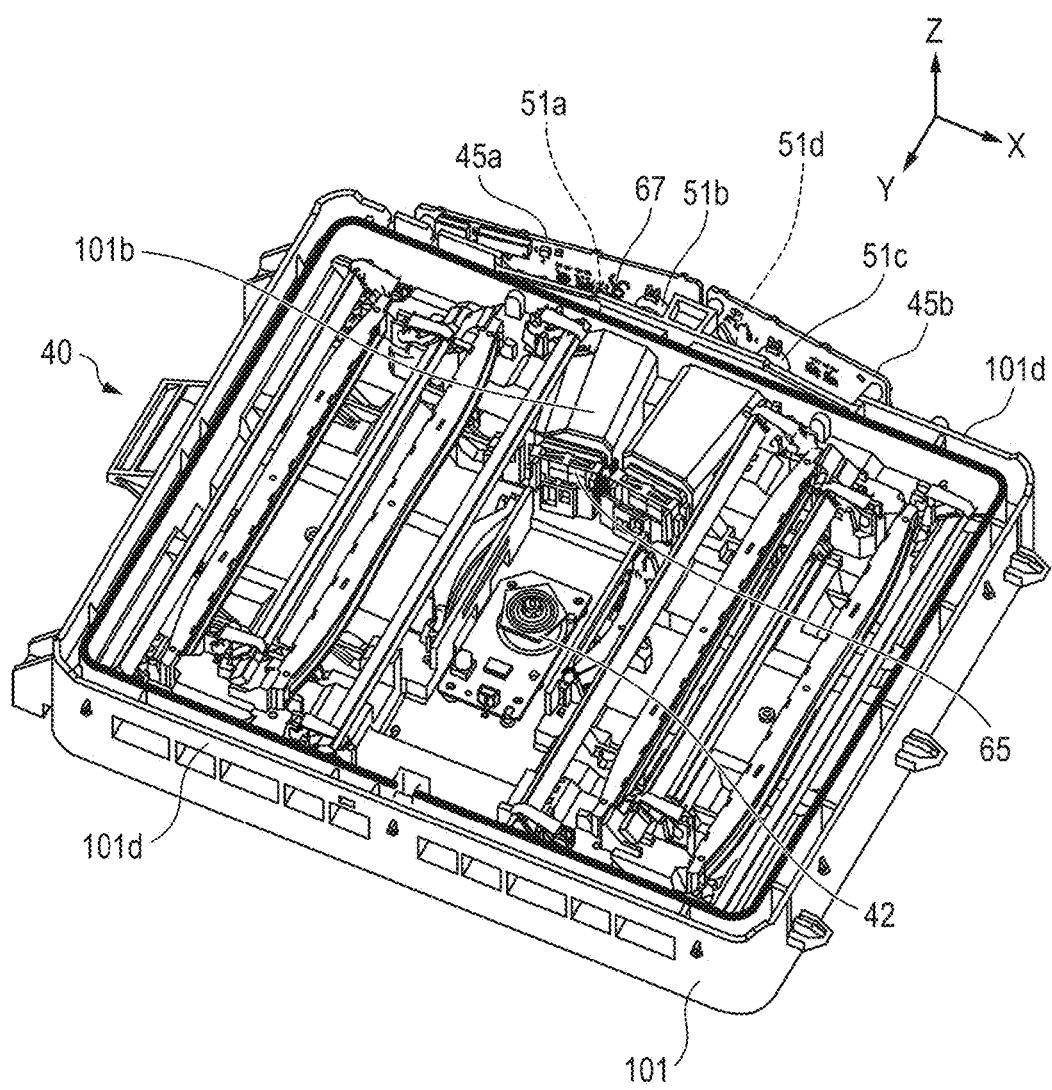
FIG. 2 is an overall perspective view of a light scanning apparatus according to the embodiment.
Figure 3:
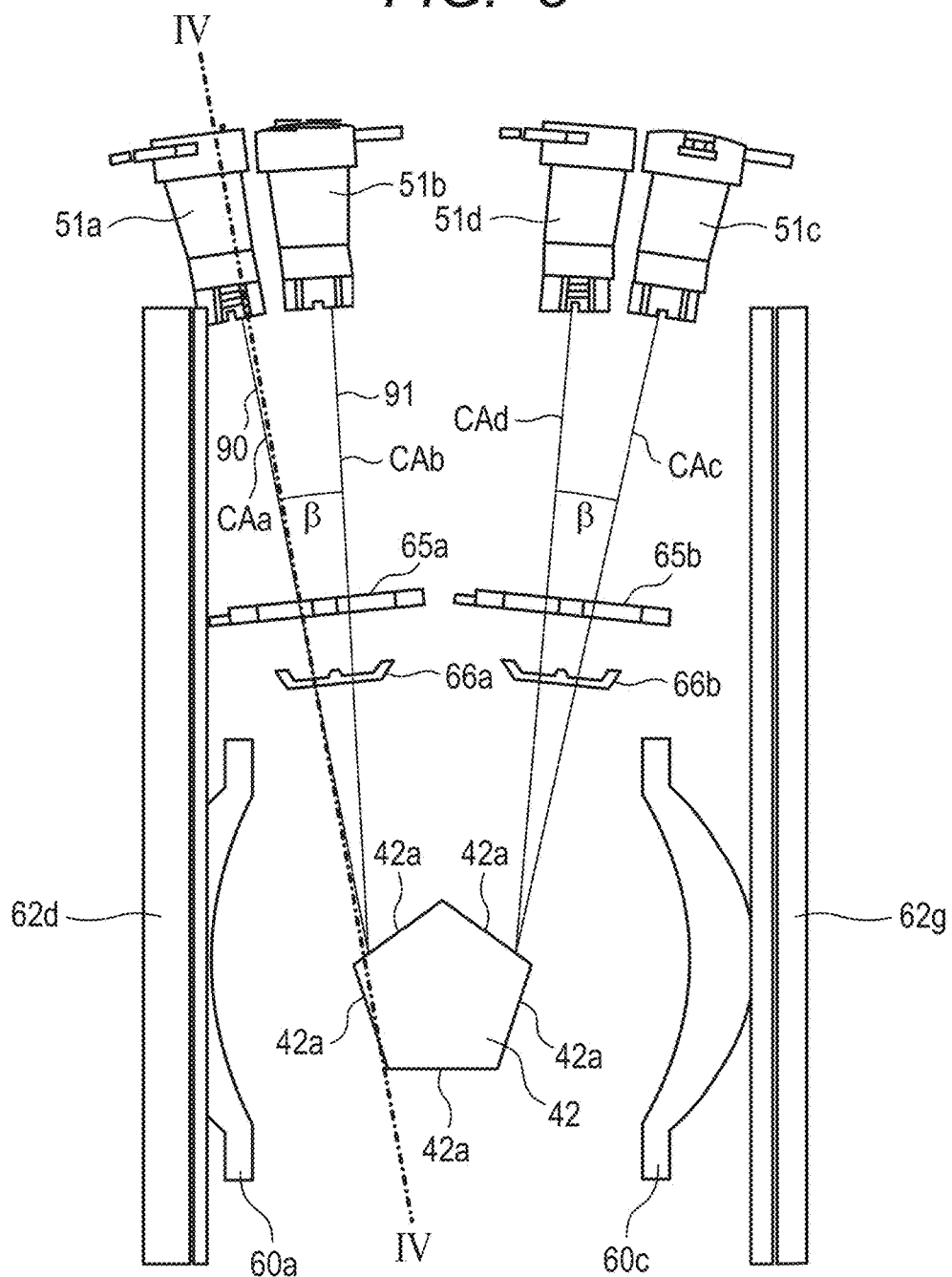
FIG. 3 is a view illustrating main parts that are arranged from light sources to a rotary polygon mirror of the light scanning apparatus according to the embodiment.
Figure 4:
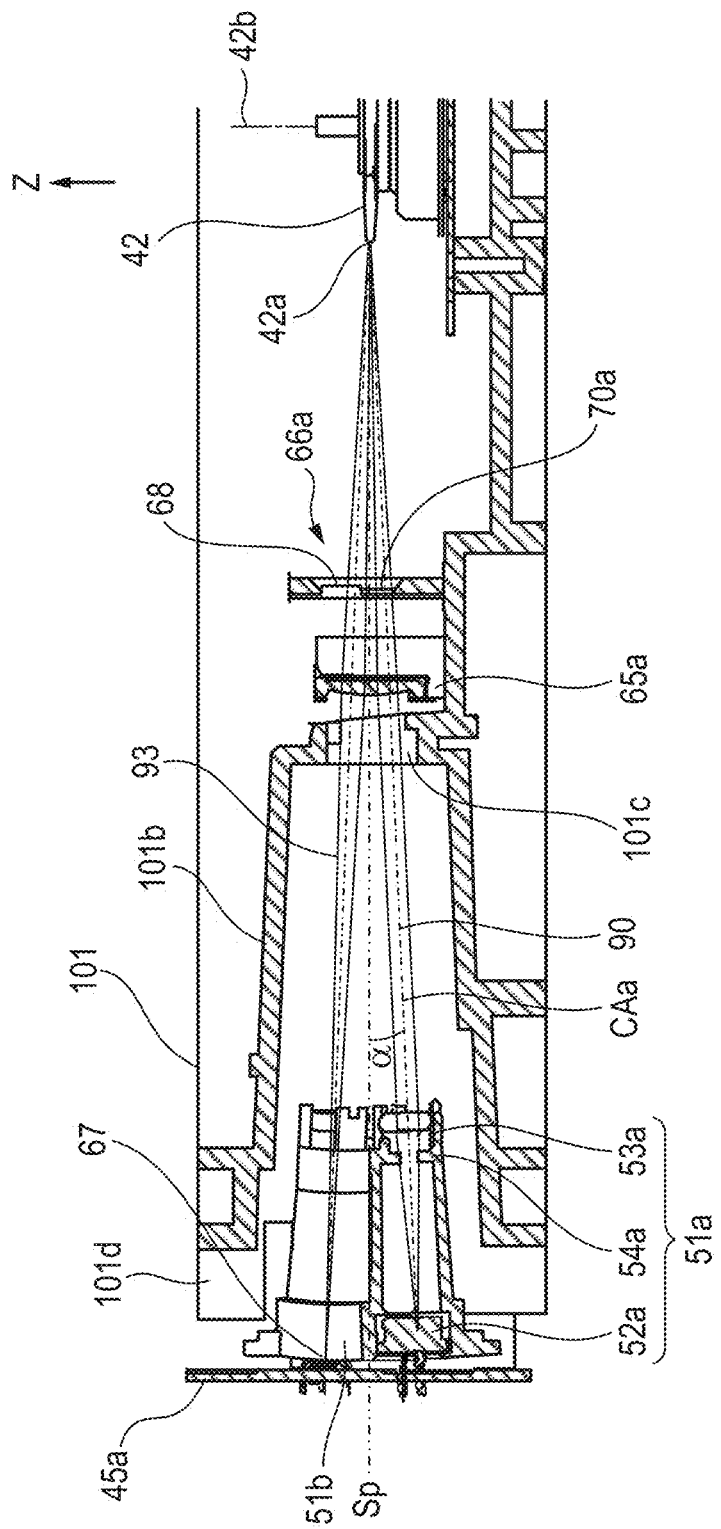
FIG. 4 is a cross-sectional view illustrating main parts that are arranged from light sources to the rotary polygon mirror of the light scanning apparatus according to the embodiment.
Figure 6:
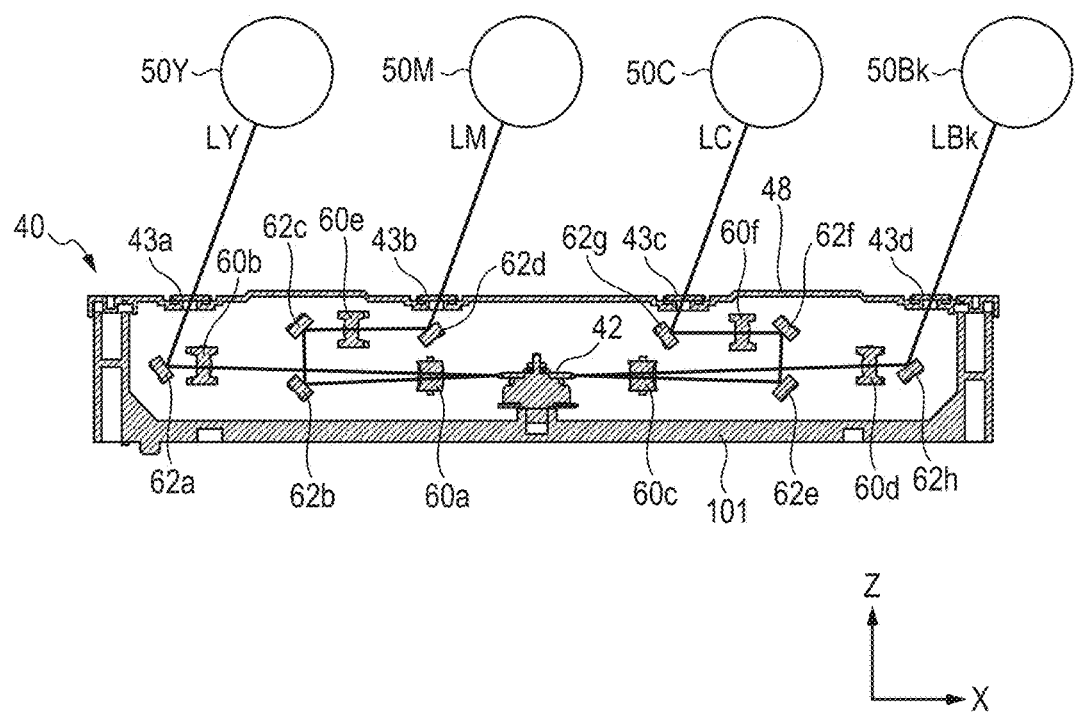
FIG. 6 is a cross-sectional view illustrating optical paths of laser beams according to the embodiment.

FIG. 2 is a perspective view of the light scanning apparatus 40 in a state in which an upper cover 48 (see FIG. 6) thereof has been taken off, and shows the internal configuration of the light scanning apparatus 40 as seen from above. FIG. 3 is a schematic diagram in which the optical paths of laser beams emitted from light sources until the laser beams reach reflection surfaces 42a of the rotary polygon mirror 42 are seen from the rotation axis direction (+Z direction) of the rotary polygon mirror 42. FIG. 4 is a cross-sectional view along a line IV-IV in FIG. 3, which is a view that illustrates main parts. FIG. 5A and FIG. 5B are perspective views that illustrate main parts from light source units 51a to 51d to the rotary polygon mirror 42. FIG. 6 is a view that illustrates the optical paths of laser beams after being deflected by the rotary polygon mirror 42. A laser beam emitted from the light source unit 51a and a laser beam emitted from the light source unit 51b are incident on the same reflection surface 42a of the rotary polygon mirror 42. A laser beam emitted from the light source unit 51d and a laser beam emitted from the light source unit 51c are incident on the same reflection surface 42a of the rotary polygon mirror 42.

For example, in the embodiment, one light source unit 51 (see 51a to 51d in FIG. 3) is provided for each image forming engine 10. Specifically, the light source unit 51a corresponds to the image forming engine 10Y, the light source unit 51b corresponds to the image forming engine 10M, the light source unit 51c corresponds to the image forming engine 10C and the light source unit 51d corresponds to the image forming engine 10Bk (see FIG. 3). In the following description, the suffixes "a" to "d" of the reference characters that correspond to the image forming engines 10Y to 10Bk are omitted unless otherwise required. The light source units 51 are mounted on circuit boards 45 together with a laser driver (not illustrated) that drives the light source units 51. The circuit board 45 is mounted on a side wall surface 101d that is erected from a bottom surface 101f of the housing 101. Specifically, two light source units 51a and 51b are mounted on a circuit board 45a, and two light source units 51c and 51d are mounted on a circuit board 45b. The optical paths of respective laser beams emitted from the light source unit 51a that is a first light source and the light source unit 51b that is a second light source are arranged on the circuit board 45a so as to have an angular difference with respect to each other in the main scanning direction and the sub-scanning direction (see FIG. 4). As illustrated in FIG. 2, the two circuit boards 45a and 45b are mounted on the side wall surface 101d of the housing 101. A synchronization sensor 67 that is described later is mounted on the circuit board 45a.

The rotary polygon mirror 42, cylindrical lenses 65, optical lenses 60 and reflection mirrors 62 and the like are disposed inside the housing 101 of the light scanning apparatus 40. A cylindrical lens 65a is provided with respect to the light source units 51a and 51b, and a cylindrical lens 65b is provided with respect to the light source units 51c and 51d. Further, a main scanning stop 66a that is a standing portion is provided with respect to the light source units 51a and 51b, and a main scanning stop 66b is provided with respect to the light source units 51c and 51d. In the following description, the suffixes "a" and "b" of the reference characters 65a, 65b, 66a and 66b are omitted unless otherwise required. The cylindrical lens 65 has a cylindrical surface 65-1.

The light source unit 51 has a semiconductor laser 52, a collimator lens 53 and a sub-scanning stop 54. A laser beam emitted from the semiconductor laser 52 is diffused light, and the diffused light is converted to parallel light by the collimator lens 53. The laser beam emitted from the light source unit 51 becomes a light beam having a predetermined width that is defined by the main scanning stop 66. The laser beam is caused to converge onto a reflection surface 42a of the rotary polygon mirror 42 by the cylindrical surface 65-1 of the cylindrical lens 65. The respective light source units 51 are disposed so that a central axis CA of a light flux of a laser beam emitted from the relevant light source unit 51 is at an angle (angle α) that is greater than 0 degrees with respect to a virtual plane Sp that is orthogonal to the axis of rotation of the rotary polygon mirror 42 (thick chain double-dashed line in the drawing). Further, two light source units 51 are on opposite sides to each other with respect to the virtual plane Sp. The shortest distance between the central axes of the light fluxes of the laser beams emitted from the two light source units 51 shortens as the laser beams approach the rotary polygon mirror 42. Note that the light flux is a cross section at a face orthogonal to the travelling direction of the laser beam. In FIG. 4, the central axis of the light flux of each laser beam emitted from the light source units 51 is indicated by an alternate long and short dash line. The virtual plane Sp intersects with a plurality of reflection surfaces 42a of the rotary polygon mirror 42.

In FIG. 3, FIG. 4, FIG. 5A and FIG. 5B, an optical path of a laser beam emitted from the light source unit 51a is represented by an optical path 90, and an optical path of a laser beam emitted from the light source unit 51b is represented by an optical path 91. Further, the optical path of a laser beam emitted from the light source unit 51a and reflected by the rotary polygon mirror 42 in the direction toward the synchronization sensor 67 is represented by an optical path 93.

On the other hand, as illustrated in FIG. 3, the light source units 51 are disposed symmetrically in pairs in a direction (also referred to as "transverse direction") that is orthogonal to the longitudinal direction of the reflection mirror 62 with respect to the rotary polygon mirror 42. The light source units 51 are disposed so as to be at different angles in a direction toward a point of deflection by the rotary polygon mirror 42. That is, with respect to the rotation direction of the rotary polygon mirror 42, the light source units 51 are disposed so that an angle between the central axes CA of the light fluxes of laser beams emitted from two light source units 51 is an angle (angle β) that is greater than 0 degrees. The shortest distance between the central axes of the light fluxes of laser beams emitted from two light source units 51 progressively shortens as the laser beams approach the rotary polygon mirror 42. The angle β is the angle when the central axes CA of the light fluxes of the laser beams are viewed from above a rotation axis 42b (FIG. 4) of the rotary polygon mirror 42.

Next, the optical paths of laser beams that are emitted from the light source units 51 and deflected by the rotary polygon mirror 42 and irradiated onto the respective photosensitive drums 50 will be described. Optical lenses 60a to 60f and reflection mirrors 62a to 62h for guiding the respective laser beams onto the corresponding photosensitive drums 50 to cause an image to be formed are disposed in the light scanning apparatus 40. The manner in which laser beams are guided to the photosensitive drums 50 by the optical lenses 60a to 60f and the reflection mirrors 62a to 62h will now be described using FIG. 6. FIG. 6 is a schematic cross-sectional view illustrating an overall image of the light scanning apparatus 40 in which the optical components are arranged. A laser beam LY corresponding to the photosensitive drum 50Y that is emitted from the light source unit 51a is deflected by the rotary polygon mirror 42 and is incident on the optical lens 60a. The laser beam LY passes through the optical lens 60a and is incident on the optical lens 60b. After passing through the optical lens 60b, the laser beam LY is reflected by the reflection mirror 62a.

The laser beam LY that was reflected by the reflection mirror 62a passes through a transparent window 43a and scans the photosensitive drum 50Y.

A laser beam LM corresponding to the photosensitive drum 50M that is emitted from the light source unit 51b is deflected by the rotary polygon mirror 42 and is incident on the optical lens 60a. The laser beam LM passes through the optical lens 60a, is reflected by the reflection mirror 62b and the reflection mirror 62c, and is incident on the optical lens 60e. After passing through the optical lens 60e, the laser beam LM is reflected by the reflection mirror 62d. The laser beam LM that was reflected by the reflection mirror 62d passes through a transparent window 43b and scans the photosensitive drum 50M.

A laser beam LC corresponding to the photosensitive drum 50C that is emitted from the light source unit 51c is deflected by the rotary polygon mirror 42 and is incident on the optical lens 60c. The laser beam LC passes through the optical lens 60c, is reflected by the reflection mirror 62e and the reflection mirror 62f, and is incident on the optical lens 60f. After passing through the optical lens 60f, the laser beam LC is reflected by the reflection mirror 62g. The laser beam LC that was reflected by the reflection mirror 62g passes through a transparent window 43c and scans the photosensitive drum 50C.

A laser beam LBk corresponding to the photosensitive drum 50Bk that is emitted from the light source unit 51d is deflected by the rotary polygon mirror 42 and is incident on the optical lens 60c. The laser beam LBk passes through the optical lens 60c and is incident on the optical lens 60d. After passing through the optical lens 60d, the laser beam LBk is reflected by the reflection mirror 62h. The laser beam LBk that was reflected by the reflection mirror 62h passes through a transparent window 43d and scans the photosensitive drum 50Bk. In the following description, the optical lenses 60a to 60d are described generically as "optical lenses 60", and the reflection mirrors 62a to 62h are described generically as "reflection mirrors 62". The optical lenses 60a and 60c that are first lenses are lenses that have strong optical power in the main scanning direction. The optical lenses 60b, 60d, 60e and 60f that are second lenses are lenses that have strong optical power in the sub-scanning direction. The optical lenses 60 are designed according to the characteristics in the main scanning direction that depend on the angle β described in FIG. 3.

[Barrel Portion]

To reduce the size of the light scanning apparatus 40, the light source unit 51 is mounted on the side wall surface 101d of the housing 101. A barrel portion 101b that covers the light source unit 51 is provided in the housing 101. In order to create a distance between the collimator lens 53 and the cylindrical lens 65, as illustrated in FIG. 4, the barrel portion 101b is formed in a tunnel shape that projects into the inside of the housing 101. An opening 101c through which a laser beam emitted from the light source unit 51 passes is provided in the housing 101. The opening 101c provided in the housing 101 forms part of the tunnel-shaped barrel portion 101b. The opening 101c is provided at the front end of the barrel portion 101b on the inner side of the housing 101. To improve the dust resistance inside the housing 101, the barrel portion 101b extends to the vicinity of the cylindrical lens 65.

[Synchronization Sensor 67]

The synchronization sensor 67 that is a light receiving portion outputs a synchronization signal (also referred to as a "BD (beam detection) signal") in response to a laser beam that was deflected and scanned by the rotary polygon mirror 42 being incident thereon. The BD signal generated by the synchronization sensor 67 is used for determining the timing at which to emit a laser beam from the light source units 51. Accompanying rotation of the rotary polygon mirror 42, a laser beam that is reflected by the reflection surfaces 42a of the rotary polygon mirror 42 is scanned in an area before image formation starts, an area during image formation and an area after image formation ends on the photosensitive drum 50. Here, the term "area before image formation starts" refers to an area up to a position at which formation of a latent image according to image data is started in the main scanning direction on the photosensitive drum 50. The term "area during image formation" refers to an area in which formation of a latent image according to image data is being performed in the main scanning direction on the photosensitive drum 50. The term "area after image formation ends" refers to an area after a position at which formation of a latent image according to image data ends in the main scanning direction on the photosensitive drum 50.

The light source unit 51a is provided at a position that is further on the bottom surface side of the housing 101 relative to the light source unit 51b in the rotation axis direction of the rotary polygon mirror 42. In the present embodiment, the synchronization sensor 67 is disposed approximately directly over (immediately above) the light source unit 51a. A laser beam that was deflected by the rotary polygon mirror 42 passes through a synchronization detection light passing portion 68 that is formed in the main scanning stop 66. A laser beam that passed through the synchronization detection light passing portion 68 formed in the main scanning stop 66 passes through a lens portion 65-2 (see FIG. 5A) and is incident on the synchronization sensor 67. The synchronization detection light passing portion 68 is integrated with the main scanning stop 66a. The lens portion 65-2 is formed integrally with the cylindrical lens 65a. A laser beam travelling toward the rotary polygon mirror 42 from the light source unit 51a and a laser beam that is reflected by the rotary polygon mirror 42 and that travels toward the synchronization sensor 67 overlap as viewed from the rotation axis direction of the rotary polygon mirror 42. In the present embodiment, because a return mirror for synchronization detection is not used, it is possible to guide a laser beam to the synchronization sensor 67 and to obtain a synchronization signal from the synchronization sensor 67 without leading to an increase in the size of the light scanning apparatus 40 and without interfering with other optical components.

The reflection mirror 62 and the like are densely disposed in the housing 101 accompanying a reduction in the size of the light scanning apparatus 40. In the present embodiment, in a configuration having the aforementioned angles α and β, the synchronization sensor 67 is disposed at a position that deviates in the direction of the angle α with respect to the light source unit 51. Thereby, the optical path 93 of the laser beam travelling toward the synchronization sensor 67 is easily secured without the optical path 93 of the laser beam being obstructed by other components inside the housing 101.

[Position of Main Scanning Stop]

FIG. 7A is a view for describing a laser beam after the laser beam is emitted from the semiconductor laser 52a and passes through a collimator lens 53a. FIG. 7A is a view as seen from the rotation axis direction (+Z direction) of the rotary polygon mirror 42, and double arrowed line in FIG. 7A indicates a direction corresponding to the main scanning direction. A laser beam emitted from a light emitting point (light emitting device) of the semiconductor laser 52a is radiated light. The collimator lens 53a has a function that converts the laser beam to parallel light. The focal distance of the collimator lens 53a is taken as "Fcol". As illustrated in FIG. 7A, an intensity center line (thick solid line) of the laser beam is parallel to the optical axis (broken line) of the collimator lens 53a until being incident on the collimator lens 53a. Upon the laser beam being incident on the collimator lens 53a, the intensity center line of the laser beam incident on the collimator lens 53a is refracted by the collimator lens 53a and passes through the focal point. Subsequently, marginal light beams (narrow solid lines) the laser beam after passing through the collimator lens become parallel to the intensity center line.

FIG. 7B is a view in which the optical path of a laser beam that passes through the main scanning stop 66a (more specifically, an opening 70a that is described later) is extracted and illustrated with respect to a case where the main scanning stop 66a is disposed between the collimator lens 53a and the rotary polygon mirror 42. Optical paths of a laser beam that passes through the main scanning stop 66a are defined as follows. A light beam (alternate long and short dash line) that passes through the center of the main scanning stop 66a is defined as a "main light beam". The main light beam is a light beam that is parallel to the intensity center line. As illustrated in FIG. 7B, the optical path of the main light beam of the laser beam that passes through the main scanning stop 66a is a line (alternate long and short dash line) linking a point of intersection between a plane that takes the optical axis (broken line) of the collimator lens 53a as the normal line and the main light beam that passes through the center of the main scanning stop 66, and the light emitting point. Therefore, as illustrated in FIG. 7B, the optical path of a marginal light beam of the laser beam that passes through the main scanning stop 66a becomes parallel to the main light beam after the marginal light beam passes through the collimator lens 53.

FIG. 8A and FIG. 8B are views that illustrate the relation between the position of the main scanning stop 66a and optical paths of laser beams emitted from a plurality of light emitting points (LDm, LDn) of the semiconductor laser 52a. Similarly to FIG. 7A and FIG. 7B, FIG. 8A and FIG. 8B are views as seen from the rotation axis direction (+Z direction) of the rotary polygon mirror 42. In comparison to FIG. 8A, in FIG. 8B the main scanning stop 66a is disposed on a closer side to the rotary polygon mirror 42. The optical paths of respective laser beams emitted from the light emitting point LDm and the light emitting point LDn are defined by the method described above using FIG. 7A and FIG. 7B. As illustrated in FIG. 8A and FIG. 8B, it is found that the closer the main scanning stop 66a is to the rotary polygon mirror 42, the smaller that differences (ΔPa and ΔPb) between spot positions of the laser beams become on the reflection surface 42a of the rotary polygon mirror 42 in the direction corresponding to the main scanning direction.

Next, the technical significance of disposing the main scanning stop 66a at a position that is as close as possible to the rotary polygon mirror 42 will be described. A predetermined reflection surface 42a of the rotary polygon mirror 42 will be referred to as "reflection surface A". A positional difference on the reflection surface A between the main light beam (alternate long and short dash line) of the light emitting point LDm and the main light beam (alternate long and short dash line) of the light emitting point LDn when the reflection surface A is at a position Ra (solid line) is ΔPa. Note that, as illustrated in FIG. 8A, the positional difference is the difference between the main light beam of the light emitting point LDm and the main light beam of the light emitting point LDn in a direction that is orthogonal to the optical axis (direction corresponding to the main scanning direction). As a result of the rotary polygon mirror 42 rotating during a very small time period Δt, the reflection surface A moves from the position Ra to a position Rb (broken line). A positional difference on the reflection surface A between the main light beam of the light emitting point LDm and the main light beam of the light emitting point LDn when the reflection surface A is at the position Rb is ΔPb. In this case, a positional difference on the reflection surface A of the main light beam of the light emitting point LDn between a time when the reflection surface A is at the position Ra and a time when the reflection surface A is at the position Rb is taken as Δab1. A positional difference on the reflection surface A of the main light beam of the light emitting point LDm between a time when the reflection surface A is at the position Ra and a time when the reflection surface A is at the position Rb is taken as Δab2. Since it is not the case that the rotary polygon mirror 42 rotates around a point of intersection between the reflection surface A and the optical axis, Δab1≠Δab2. Therefore, ΔPa≠ΔPb. That is, the positional difference between the main light beam of the light emitting point LDm and the main light beam of the light emitting point LDn on the reflection surface A of the rotary polygon mirror 42 differs depending on the rotational phase state of the rotary polygon mirror 42. Note that, the rotational phase state of the rotary polygon mirror 42 corresponds to the spot position of the laser beam in the main scanning direction.

In a case where the main scanning stop 66*a* is disposed close to the rotary polygon mirror 42 as illustrated in FIG. 8B, the positional differences ΔPa and ΔPb and the positional differences Δab1 and Δab2 all decrease in comparison to the case illustrated in FIG. 8A. Further, the focal distance Fcol of the collimator lens 53*a* changes minutely due to a rise in temperature inside the light scanning apparatus 40 caused by rotation of the rotary polygon mirror 42. The positional difference between the main light beams of the light emitting point LDm and the light emitting point LDn on the reflection surface A of the rotary polygon mirror 42 also varies according to variations in the focal distance Fcol of the collimator lens 53*a*. For the foregoing reasons, it is good to dispose the main scanning stop 66*a* at a position that is close to the rotary polygon mirror 42. The foregoing also applies with respect to the other light source units 51*b*, 51*c* and 51*d* and the main scanning stop 66*b*.

[Emitting Timing]

Figure 9A:
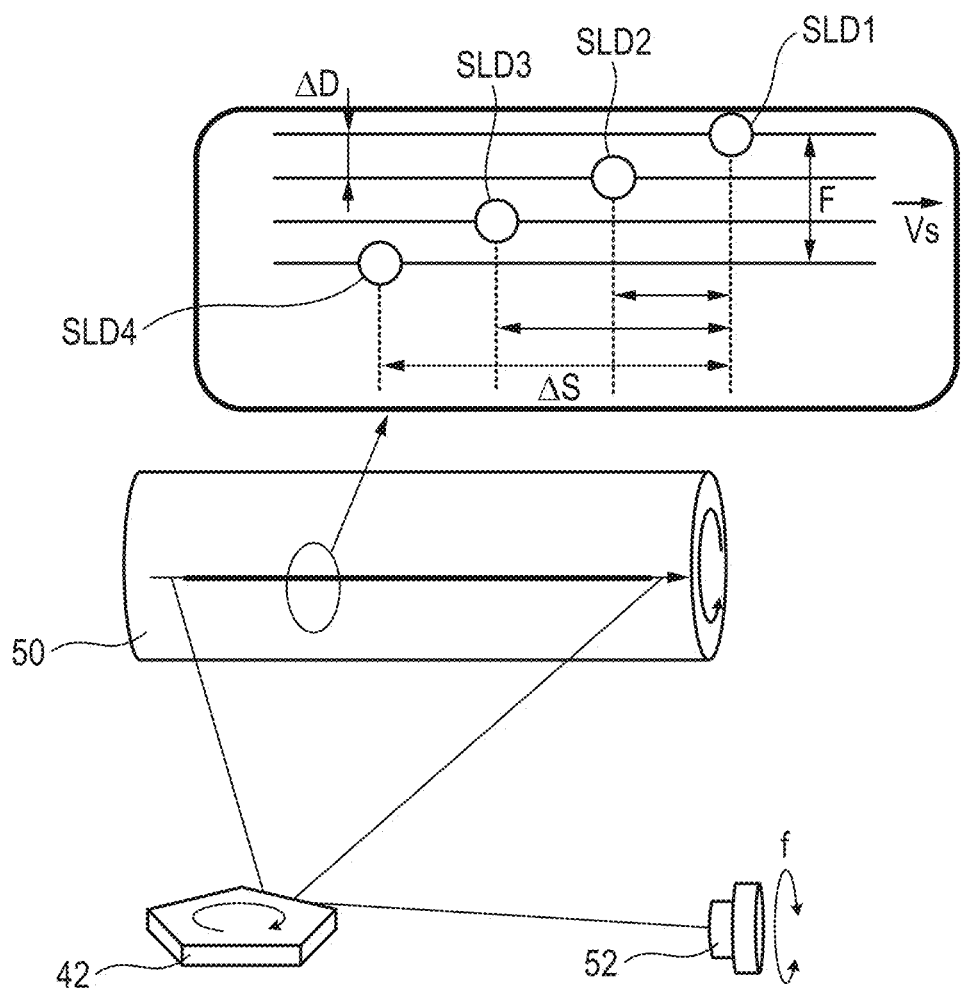
FIG. 9A is a view illustrating positions of a spot on a photosensitive drum according to the embodiment.
Figure 9B:
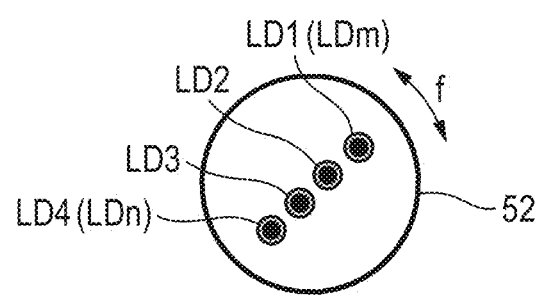
FIG. 9B is a view illustrating four light emitting points of a semiconductor laser.

FIG. 9A is a view illustrating the manner in which a laser beam emitted from the semiconductor laser 52 and reflected at the reflection surface A of the rotary polygon mirror 42 is scanned in the main scanning direction on the photosensitive drum 50. FIG. 9A also shows a view in which a scanning line on the photosensitive drum 50 is enlarged. In FIG. 9A, reference character SLD1 denotes a spot that a laser beam which is emitted from a light emitting point LD1 of the semiconductor laser 52 forms on the photosensitive drum 50. Reference character SLD2 denotes a spot that a laser beam which is emitted from a light emitting point LD2 of the semiconductor laser 52 forms on the photosensitive drum 50. Reference character SLD3 denotes a spot that a laser beam which is emitted from a light emitting point LD3 of the semiconductor laser 52 forms on the photosensitive drum 50. Reference character SLD4 denotes a spot that a laser beam which is emitted from a light emitting point LD4 of the semiconductor laser 52 forms on the photosensitive drum 50. FIG. 9B illustrates the four light emitting points LD1, LD2, LD3 and LD4 of the semiconductor laser 52. Note that, the light emitting point LD1 corresponds to the light emitting point LDm of FIG. 8A and the like, and the light emitting point LD4 corresponds to the light emitting point LDn of FIG. 8A and the like.

As illustrated in FIG. 9A, an interval between the respective spots of a laser beam on the photosensitive drum 50 is taken as "ΔD" (hereunder, referred to as "spot interval"). The semiconductor laser 52 is adjusted so that the spot interval ΔD corresponds to the resolution of the printer 100 by rotating a chip holder in the direction of an arrow f during assembly of the light scanning apparatus 40 at the factory. By rotationally adjusting the chip holder of the semiconductor laser 52, the positional relation (exposure position relation) between spots on the photosensitive drum 50 of laser beams emitted from the respective light emitting points LD1, LD2, LD3 and LD4 becomes the positional relation illustrated in FIG. 9A. Note that, when the interval between the spot SLD1 and the spot SLD4 is taken as F, the spot interval ΔD is represented by ΔD=F/3.

The following control is required in order to suppress a deviation in the main scanning direction between a dot that is formed by the light emitting point LD1 and a dot that is formed by the light emitting point LD4. That is, taking the BD signal as a reference, it is necessary to delay the emitting timing (lighting-up timing) of the light emitting point LD4 relative to the emitting timing of the light emitting point LD1 based on image data. A theoretical value of a time period T (hereunder, referred to as "delay time") by which to delay the emitting timing of the light emitting point LD4 is T=ΔS/Vs. Here, ΔS represents the positional difference in the main scanning direction between the spot SLD1 and the spot SLD4 (hereunder, referred to as "spot position difference"), and Vs represents the scanning speed of the laser beam on the photosensitive drum 50. The delay time T is determined in the factory using a measurement apparatus.

Figure 10:
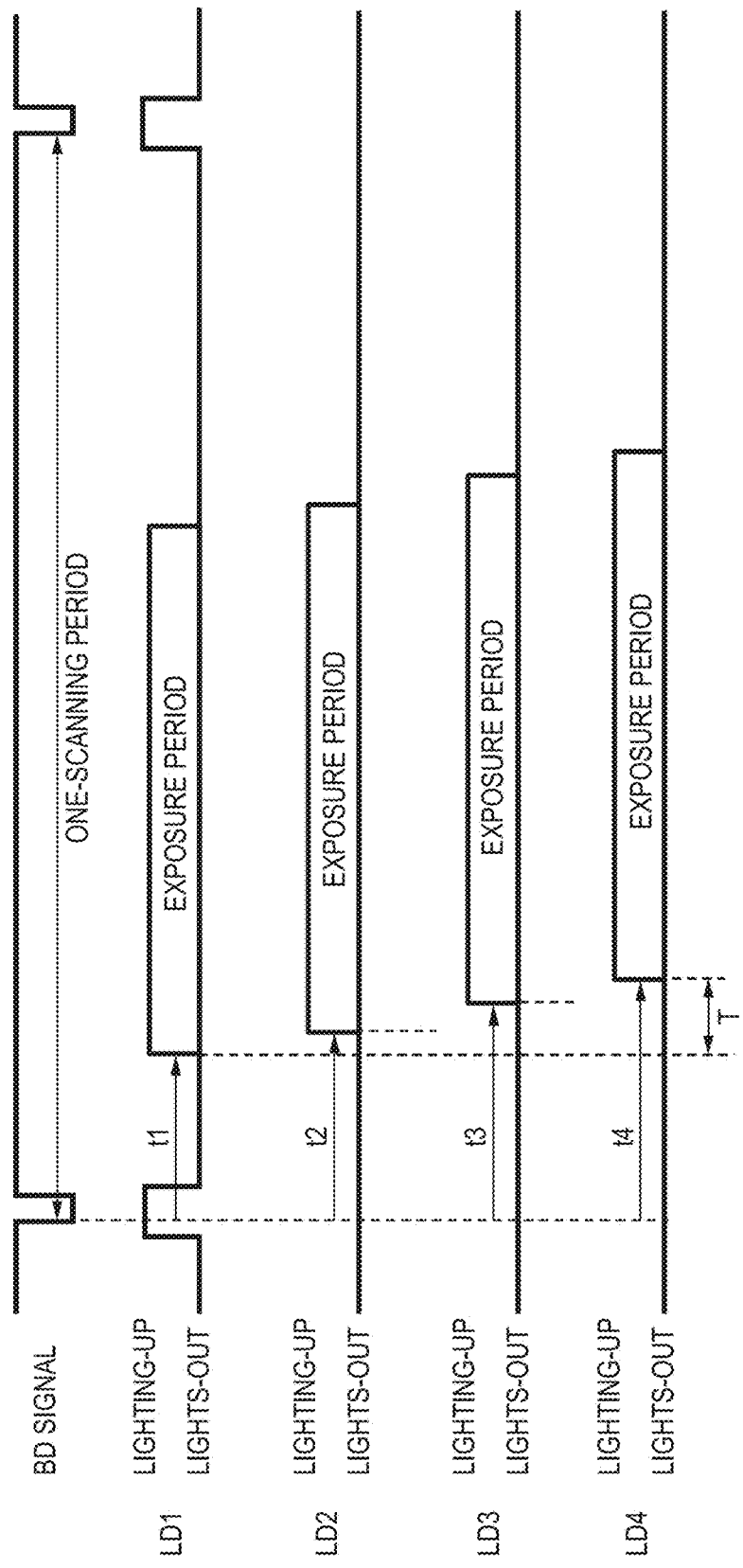
FIG. 10 is a view for describing time differences between respective light emitting points according to the embodiment.

FIG. 10 is a view illustrating a BD signal that is output from the synchronization sensor 67, and the manner of lighting-up and lights-out of the respective light emitting points LD1 to LD4. A period from the falling edge of the BD signal to the falling edge of the next BD signal is taken as one scanning period. As illustrated in FIG. 10, differences are set between the emitting timings for emitting the laser beams from the respective light emitting points LD1 to LD4 based on the BD signal during one scanning period of the laser beams. Thereby, the positions in the main scanning direction of dots formed by the respective light emitting points LD1 to LD4 are aligned. As described above, a delay time from the emitting timing of the light emitting point LD1 to the emitting timing of the light emitting point LD4 is represented by "T". The differences (delay times) between the emitting timings of the light emitting point LD2 to the light emitting point LD4 relative to the emitting timing of the light emitting point LD1 are T×⅓, T×⅔ and T. The time periods from the falling edge of the BD signal to the emitting timings of the respective light emitting points LD1 to LD4 are taken as t1 to t4. The time period t2 from the falling edge of the BD signal to the emitting timing of the light emitting point LD2 is t1+T×⅓. The time period t3 from the falling edge of the BD signal to the emitting timing of the light emitting point LD3 is t1+T×⅔. The time period t4 from the falling edge of the BD signal to the emitting timing of the light emitting point LD4 is t1+T.

The delay time T is determined using a measurement apparatus at the factory. The measurement apparatus includes a light-receiving sensor that receives a laser beam that was deflected by the rotary polygon mirror 42. The light-receiving sensor corresponds to the surface of the photosensitive drum 50, and is disposed at a predetermined position in the scanning direction of the laser beam (for example, a position corresponding to the center part of the photosensitive drum 50). The delay time T determined by the measurement apparatus corresponds to a spot position difference at the position at which the light-receiving sensor is disposed in the main scanning direction.

However, as described above with reference to FIG. 8A and FIG. 8B, a spot position difference between light emitting devices in the main scanning direction differs depending on the scan positions of the laser beams. That is, the delay time T is not a value that shows a spot position difference between light emitting devices at all positions in the main scanning direction. Therefore, the main scanning stop 66 is disposed at a position that is as close as possible to the rotary polygon mirror 42 to decrease variations in the spot position difference between light emitting devices at all positions in the main scanning direction. Thus, it is necessary to suppress a deviation between a dot that is formed by the light emitting point LDm and a dot that is formed by the light emitting point LDn at all positions in the main scanning direction. The foregoing is a description of the reason that the main scanning stop 66 is arranged at a position close to the rotary polygon mirror 42.

[Surface Eccentricity of Rotary Polygon Mirror]

Figure 11:
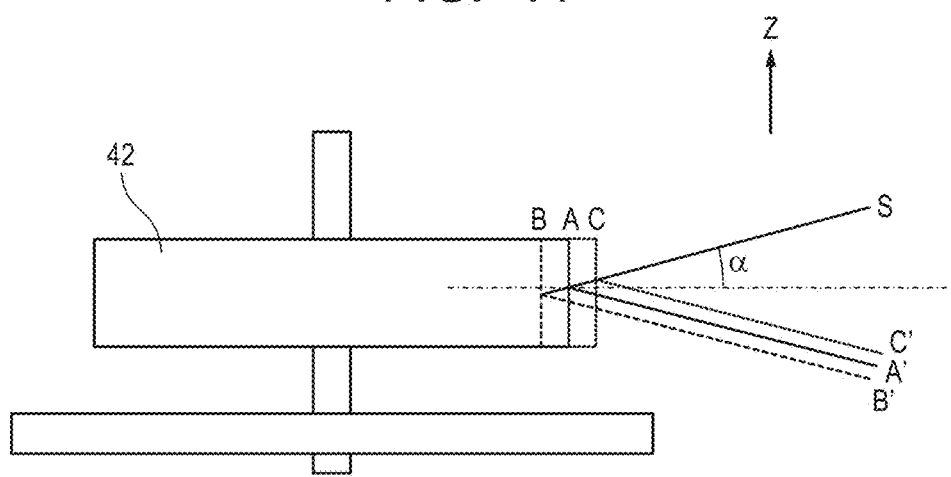
FIG. 11 is a view illustrating the vicinity of the rotary polygon mirror according to the embodiment.

The rotary polygon mirror 42 has, for example, five reflection surfaces 42a. Due to variations in machining, a distance from the rotation axis 42b differs for each of the five reflection surfaces 42a. This is referred to as "surface eccentricity". FIG. 11 is a view that illustrates deviations in the optical paths of a laser beam due to surface eccentricity of the rotary polygon mirror 42. As illustrated in FIG. 11, because of the existence of surface eccentricity on the rotary polygon mirror 42, the positions of the reflection surfaces 42a change depending on rotation of the rotary polygon mirror 42. In FIG. 11, three reflection surfaces 42a among the five reflection surfaces 42a of the rotary polygon mirror 42 are illustrated, and are referred to as reflection surfaces A (solid line), B (broken line) and C (dotted line).

If a laser beam S is diagonally incident on the reflection surfaces A, B and C of the rotary polygon mirror 42, even when the laser beam S is from the same light source, the reflected laser beam will pass through a different area of the optical lens 60 depending on which of the reflection surfaces A, B and C of the rotary polygon mirror 42 that the laser beam is reflected by. For example, if the laser beam S is reflected by the reflection surface A, the reflected laser beam will travel along an optical path A' that is indicated by a solid line. If the laser beam S is reflected by the reflection surface B, the reflected laser beam will travel along an optical path B' that is indicated by a broken line. If the laser beam S is reflected by the reflection surface C, the reflected laser beam will travel along an optical path C' that is indicated by a dotted line. Therefore, the irradiation position in the sub-scanning direction on the surface of the photosensitive drum 50 periodically changes. Because the irradiation position in the sub-scanning direction periodically changes, the interval between scanning lines becomes non-uniform, and an image defect (banding) that has band-like density unevenness arises. As illustrated in FIG. 11, when the angle of incidence of the laser beam S with respect to the normal line (alternate long and short dash line) of the reflection surfaces A, B and C is taken as "α", the smaller that the angle of incidence α is, the greater the extent to which the influence of surface eccentricity of the rotary polygon mirror 42 can be reduced.

[Synchronization Sensor]

Figure 12A:
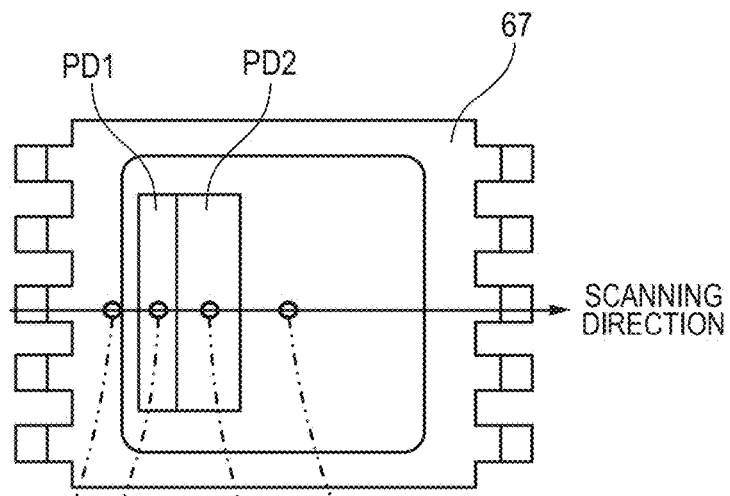
FIG. 12A is an enlarged view of a synchronization sensor according to the embodiment.

The synchronization sensor 67 outputs a BD signal based on an output change when a spot of a laser beam passes through the synchronization sensor 67. FIG. 12A is an enlarged view of the synchronization sensor 67. The synchronization sensor 67, for example, has two photodiodes (hereunder, referred to as "PD") PD1 and PD2. The PD1 and PD2 are disposed adjacent to each other. An arrow in FIG. 12A indicates the scanning direction of the laser beam, and a "○" mark on a line indicating the scanning direction represents a spot of a laser beam. The spot of a laser beam passes from an area in which the PD1 and PD2 are not disposed, to a position on the PD1, and a position on the PD2 in that order, and is thereafter scanned again in an area in which PD1 and PD2 are not disposed. Four spots of the laser beam are illustrated in FIG. 12A.

Figure 12B:
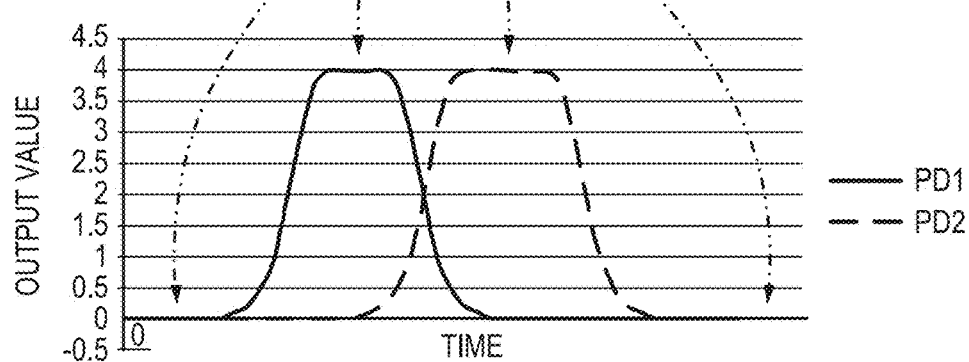
FIG. 12B is a view illustrating output values of the synchronization sensor.

FIG. 12B is a graph in which time is shown on the abscissa axis and output values of the PD1 and the PD2 are shown on the axis of ordinates, in which the output of the PD1 is indicated by a solid line and the output of the PD2 is indicated by a broken line. The spot of a laser beam passes from the PD1 side to the PD2 side on the synchronization sensor 67. When the spot of the laser beam is on the PD1, the output of the PD1 increases and there is no change in the output of the PD2. Upon the spot of the laser beam moving off the PD1 and being incident on the PD2, the output of the PD1 decreases and the output of the PD2 increases. The synchronization sensor 67 outputs a BD signal that serves as a reference for image formation by taking a timing at which the outputs of the PD1 and the PD2 are inverted (hereunder, referred to as "cross point") as a trigger for outputting the BD signal. Thus, by using the two PDs, i.e. PD1 and PD2, in the synchronization sensor, a stable BD signal that is not affected by the environment, such as temperature changes, can be output.

Figure 12C:
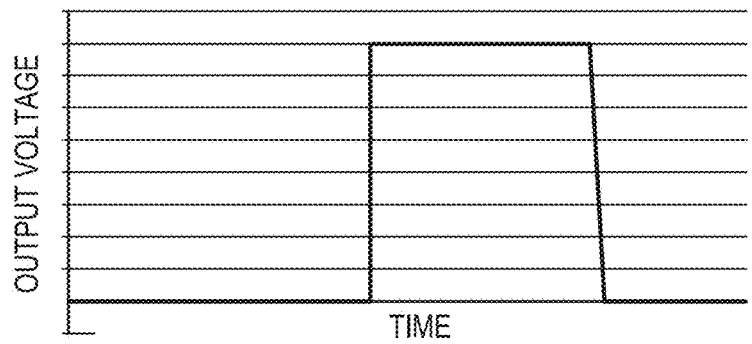
FIG. 12C is a view illustrating an output voltage of the synchronization sensor.

FIG. 12C is a view illustrating the timing at which a signal is output based on the outputs of the PD1 and PD2 shown in FIG. 12B, in which time is shown on the abscissa axis and an output voltage is shown on the axis of ordinates. Note that, in practice the BD signal that is output from the synchronization sensor 67 is, as illustrated in FIG. 10, a signal that falls at a cross point of the PD1 and the PD2.

[Main Scanning Stop]

Figure 13A:
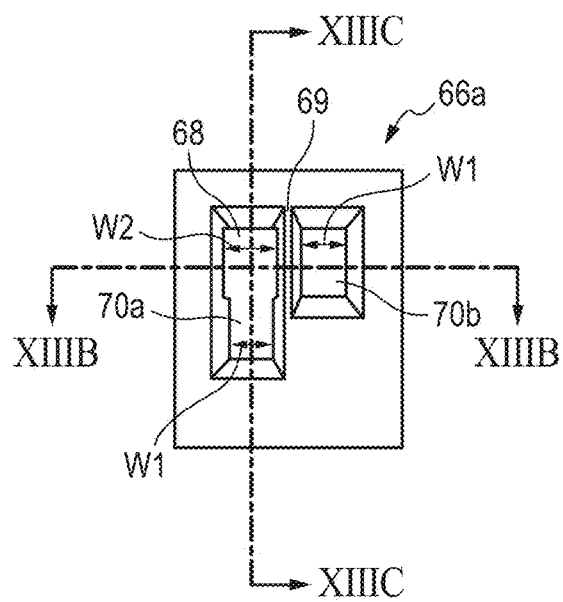
FIGS. 13A, 13B and 13C are views illustrating the configuration of a main scanning stop according to the embodiment.
Figure 13C:
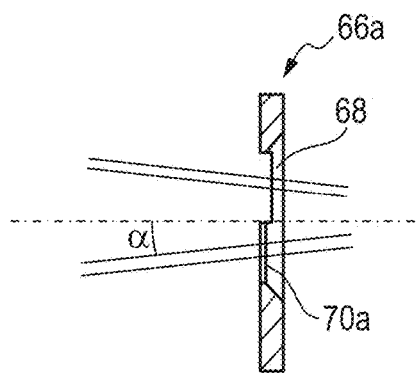
Figure 13B:
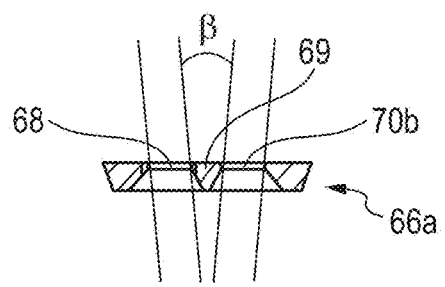

FIG. 13A, FIG. 13B and FIG. 13C are views for describing the configuration of the main scanning stop 66a. FIG. 13A is a view that illustrates the main scanning stop 66a as seen from the rotary polygon mirror 42. FIG. 13B is a cross-sectional view along a line XIIIB-XIIIB in FIG. 13A, in which the light source unit 51a is disposed on the upper side in FIG. 13B and the rotary polygon mirror 42 is disposed on the lower side in FIG. 13B. FIG. 13C is a cross-sectional view along a line XIIIC-XIIIC in FIG. 13A, in which the light source unit 51a is disposed on the left side in FIG. 13C and the rotary polygon mirror 42 is disposed on the right side in FIG. 13C. A laser beam emitted from the light source unit 51a passes through the opening 70a provided in the main scanning stop 66a and arrives at the rotary polygon mirror 42. A laser beam emitted from the light source unit 51b passes through an opening 70b that is a second opening provided in the main scanning stop 66a and arrives at the rotary polygon mirror 42. The widths of the openings 70a and 70b are provided so as to be approximately the same width, and the width of each of the opening 70a and 70b is referred to as the width of the main scanning stop 66a, and is represented by "W1".

An opening for guiding a laser beam emitted from the light source unit 51a and reflected by the rotary polygon mirror 42 to the synchronization sensor 67 is provided in the main scanning stop 66a. Hereunder, this opening is referred to as "synchronization detection light passing portion 68". Hereunder, the width of the synchronization detection light passing portion 68 is represented by "W2". Note that, the opening 70a and the synchronization detection light passing portion 68 correspond to a first opening. The opening 70a and the synchronization detection light passing portion 68 that are the first opening block a part of the laser beam that is emitted from the light source unit 51a and that travels toward the rotary polygon mirror 42, and allow light that is emitted from the light source unit 51a and reflected by the rotary polygon mirror 42 and that travels toward the synchronization sensor 67 to pass through. The angles $\alpha$ and $\beta$ are the angles described above referring to FIG. 3 and FIG. 4 and the like. To allow the spot of the laser beam to pass over the synchronization sensor 67 as illustrated in FIG. 12A, passage holes are formed so that a width W2 that is an area which synchronization detection light (optical path 93 in FIG. 4) passes through is larger than a width W1 of the main scanning stop 66a (W2>W1). Thereby, a width that a laser beam passes through is secured so that a laser beam reflected by the rotary polygon mirror 42 can adequately scan the top of the synchronization sensor 67 illustrated in FIG. 12A.

A separating section is not provided between the opening 70a and the synchronization detection light passing portion 68, and an opening that is vertically long in the sub-scanning direction is formed by the opening 70a and the synchronization detection light passing portion 68. On the other hand, a blocking section 69 is provided between the opening 70b and the synchronization detection light passing portion 68. As described above referring to FIG. 8A and the like, when the main scanning stop 66a is disposed close to the rotary polygon mirror 42 to make the spot position difference between the laser beams as small as possible, due to the influence of the angle $\alpha$, the distance between the incident light (optical path 90) and the synchronization detection light (optical path 93) becomes short (see FIG. 4). On the other hand, as described above referring to FIG. 7A and the like, the main scanning stop 66a is provided to define the width of the laser beams emitted from the light source units 51a and 51b. Therefore, the main scanning stop 66a cannot be disposed close to the rotary polygon mirror 42 to an extent such that the blocking section 69 that separates the openings 70a and 70b cannot be formed. Therefore, the main scanning stop 66a is brought close to the rotary polygon mirror 42 up to a position such that the opening 70a of the main scanning stop 66a and the synchronization detection light passing portion 68 become the same passage hole. Thereby, it is possible for laser beams emitted from the light source units 51a and 51b and a laser beam that is reflected by the rotary polygon mirror 42 and that travels toward the synchronization sensor 67 to each be scanned or incident in a stable state.

Further, by configuring the main scanning stop 66a as illustrated in FIG. 13A, a minute manufacturing process for arranging a structure in a minute clearance in which the incident light (optical path 90) and the synchronization detection light (optical path 93) are at a close distance to each other is not required. In the present embodiment, for example, the main scanning stop 66a is disposed at a position such that the relation $2\alpha<\beta$ is satisfied. Note that, in consideration of machining stability, a configuration may also be adopted such that $2\alpha>\beta$. Even when a configuration is adopted such that $2\alpha>\beta$, it is desirable to make the opening 70a and the synchronization detection light passing portion 68 the same hole. The same applies with respect to the main scanning stop 66b.

As illustrated in FIG. 13A, the openings 70a and 70b and the synchronization detection light passing portion 68 are formed so that the openings widen in the direction toward the rotary polygon mirror 42. By designing the shape of the openings 70a and 70b and the synchronization detection light passing portion 68 in this way, a die can be released on the rotary polygon mirror 42 side when molding the main scanning stop 66a. The same applies with respect to the main scanning stop 66b.

Note that, the shapes of the spots of the respective laser beams emitted from the light source units 51c and 51d are shaped by the main scanning stop 66b. The laser beam emitted from the light source unit 51c passes through an opening 70c (FIG. 5B) provided in the main scanning stop 66b and reaches the rotary polygon mirror 42. The laser beam emitted from the light source unit 51d passes through an opening 70d (FIG. 5B) provided in the main scanning stop 66b and reaches the rotary polygon mirror 42. The widths of the openings 70c and 70d are provided to be the width W1 that is approximately the same as that of the openings 70a and 70b. Note that, in order to define widths that are required for the respective colors, the widths of the openings 70c and 70d may be provided so as to be different to the widths of the openings 70a and 70b.

As described in the foregoing, according to the present embodiment a reduction in the size of a light scanning apparatus can be realized without decreasing image quality. According to the present embodiment, a light scanning apparatus can be provided in which a standing portion that is disposed between a light source and a rotary polygon mirror and that has an opening that allows a part of a laser beam emitted from the light source to pass therethrough does not block a laser beam travelling toward a light receiving portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025997, filed Feb. 15, 2017, which is hereby incorporated by reference herein in its entirety.

What is claimed is:
1. A light scanning apparatus, comprising:
  a first light source configured to emit a first laser beam for exposing a first photosensitive member;
  a second light source configured to emit a second laser beam for exposing a second photosensitive member;
  a rotary polygon mirror having a plurality of reflection surfaces and driven to be rotated, the rotary polygon mirror deflecting the first laser beam by the plurality of reflection surfaces so that the first laser beam scans the first photosensitive member, the rotary polygon mirror deflecting the second laser beam by the plurality of reflection surfaces so that the second laser beam scans the second photosensitive member;
  a light receiving portion configured to receive the first laser beam deflected by the rotary polygon mirror to generate a synchronization signal for controlling an emitting timing of the first laser beam based on image data in a scanning period of the first laser beam and an emitting timing of the second laser beam based on image data in a scanning period of the second laser beam;

a housing configured to contain the rotary polygon mirror; and a standing portion provided in the housing and disposed between the first light source and the rotary polygon mirror and between the second light source and the rotary polygon mirror, wherein the first light source and the second light source are disposed on opposite sides to each other with respect to a virtual plane that is orthogonal to a rotation axis of the rotary polygon mirror and that intersects with the plurality of reflection surfaces, and the first light source and the second light source are disposed in the light scanning apparatus so that the first laser beam and the second laser beam are incident on a same reflection surface among the plurality of reflection surfaces, a central axis of a flux of the first laser beam that is incident on the reflection surface and the virtual plane form an angle that is greater than 0 degrees, a central axis of a flux of the second laser beam that is incident on the reflection surface and the virtual plane form an angle that is greater than 0 degrees, and when the central axis of the flux of the first laser beam that is incident on the reflection surface and the central axis of the flux of the second laser beam that is incident on the reflection surface are viewed from the rotation axis of the rotary polygon mirror, the central axis of the flux of the first laser beam and the central axis of the flux of the second laser beam form an angle that is greater than 0 degrees, wherein a first opening through which a part of the first laser beam that is incident on the rotary polygon mirror and the first laser beam deflected by the rotary polygon mirror pass and a second opening through which a part of the second laser beam that is incident on the rotary polygon mirror passes are provided in the standing portion, and wherein the first laser beam that is deflected by the rotary polygon mirror and passes through the first opening is incident on the light receiving portion.

2. The light scanning apparatus according to claim 1, wherein the housing has a bottom surface on which the rotary polygon mirror is mounted and a side wall surface which is standing from the bottom surface and on which the first light source and the second light source are mounted;

wherein the first light source is provided at a position that is further on a side of the bottom surface of the housing than the second light source in a direction of the rotation axis of the rotary polygon mirror, and wherein the light receiving portion is disposed directly above the first light source in the direction of the rotation axis of the rotary polygon mirror.

3. The light scanning apparatus according to claim 2, wherein the first light source and the light receiving portion are mounted on a same circuit board.

4. The light scanning apparatus according to claim 3, wherein the second light source is mounted on the circuit board.

5. The light scanning apparatus according to claim 1, wherein the first opening is configured so that an area through which the first laser beam that is incident on the light receiving portion passes has a width in a scanning direction of the first laser beam which is wider than a width in the scanning direction of an area through which the first laser beam that is emitted from the first light source passes.

6. The light scanning apparatus according to claim 2, wherein the standing portion is formed integrally with the housing.

7. The light scanning apparatus according to claim 6, wherein the standing portion is formed in the housing so as to satisfy the following relation:

$$2 \times \alpha < \beta$$

where

α: an angle which is formed by the central axis of the flux of the first laser beam that is incident on the reflection surface and the virtual plane, α: an angle which is formed by the central axis of the flux of the second laser beam that is incident on the reflection surface and the virtual plane, and β: an angle which is formed by the central axis of the flux of the first laser beam that is emitted from the first light source and the central axis of the flux of the second laser beam that is emitted from the second light source.

8. The light scanning apparatus according to claim 1, further comprising a cylindrical lens configured to condense the first laser beam that is emitted from the first light source onto the reflection surface of the rotary polygon mirror, wherein the first laser beam that is emitted from the first light source and is reflected by the rotary polygon mirror and travels toward the light receiving portion passes through the cylindrical lens and is incident on the light receiving portion.

9. The light scanning apparatus according to claim 1, wherein the first light source has a plurality of light emitting points, and the second light source has a plurality of light emitting points.

10. A light scanning apparatus, comprising:

a first light source configured to emit a first laser beam for exposing a first photosensitive member;

a second light source configured to emit a second laser beam for exposing a second photosensitive member;

a rotary polygon mirror having a plurality of reflection surfaces and driven to be rotated, the rotary polygon mirror deflecting the first laser beam by the plurality of reflection surfaces so that the first laser beam scans the first photosensitive member, the rotary polygon mirror deflecting the second laser beam by the plurality of reflection surfaces so that the second laser beam scans the second photosensitive member;

a light receiving portion configured to receive the first laser beam deflected by the rotary polygon mirror to generate a synchronization signal for controlling an emitting timing of the first laser beam based on image data in a scanning period of the first laser beam and an emitting timing of the second laser beam based on image data in a scanning period of the second laser beam;

an optical housing configured to contain the rotary polygon mirror; and an opening portion provided in the optical housing and provided with a single opening through which both of the first laser beam emitted from the first light source toward the rotary polygon mirror and the first laser beam deflected by the rotary polygon mirror to be incident on the light receiving portion pass, the single opening being provided as an aperture for the first laser beam emitted from the first light source toward the rotary polygon mirror.

11. The light scanning apparatus according to claim 10, wherein the single opening is configured to block portions on both sides of the second laser beam incident on the single opening in a direction corresponding to a direction in which the second laser beam scans the second photosensitive member.

12. The light scanning apparatus according to claim 11, wherein the opening portion further comprises a second opening through which the first laser beam from the first light source toward the rotary polygon mirror passes and which is different from the single opening, the second opening being configured to block portions on both sides of the first laser beam incident on the second opening in a direction corresponding to a direction in which the first laser beam scans the first photosensitive member.

13. The light scanning apparatus according to claim 10, wherein the housing has a bottom surface on which the rotary polygon mirror is mounted and a side wall surface which is standing from the bottom surface and on which the first light source and the second light source are mounted, wherein the first laser beam and the second laser beam are incident on a reflection surface of the plurality of reflection surfaces of the rotary polygon mirror at respective angles with respect to a virtual plane that is perpendicular to a rotation axis of the rotary polygon mirror and passes through the rotary polygon mirror, wherein the first light source and the second source are arranged opposite to each other with respect to the virtual plane, and wherein when an optical path of the first laser beam incident on the rotary polygon mirror and an optical path of the second laser beam incident on the rotary polygon mirror are viewed along a rotation axis direction of the rotary polygon mirror, the optical path of the first laser beam and the optical path of the second laser beam form an angle greater than 0.

14. The light scanning apparatus according to claim 13, wherein the first light source and the light receiving portion are mounted on a same circuit board.

15. The light scanning apparatus according to claim 14, wherein the second light source is mounted on the circuit board.

16. The light scanning apparatus according to claim 10, wherein the single opening is configured so that an area through which the first laser beam that is incident on the light receiving portion passes has a width in a scanning direction of the first laser beam which is wider than a width in the scanning direction of an area through which the first laser beam that is emitted from the first light source passes.

* * * * *